United States Patent [19]

Bagley et al.

[11] Patent Number: 4,591,947

[45] Date of Patent: May 27, 1986

[54] TUBULAR CAPACITOR AND METHOD OF MAKING

[75] Inventors: Rodney D. Bagley, Big Flats, N.Y.; Andrew Herczog, Melbourne Beach, Fla.

[73] Assignee: Corning Glass Works, Corning, N.Y.

[21] Appl. No.: 736,812

[22] Filed: May 22, 1985

[51] Int. Cl.⁴ .......................... H01G 1/14; H01G 4/28
[52] U.S. Cl. ..................... 361/310; 29/25.42; 361/321
[58] Field of Search ............... 29/25.42; 361/306, 310, 361/320, 321

[56] References Cited

U.S. PATENT DOCUMENTS

| | | | |
|---|---|---|---|
| 2,793,333 | 5/1957 | Ehlers | 361/321 X |
| 3,183,419 | 5/1965 | Rieth | 361/321 X |
| 3,246,215 | 4/1966 | Rieth | 29/25.42 X |
| 3,274,468 | 9/1966 | Rodriguez et al. | 361/321 |
| 4,109,292 | 8/1978 | Shibayama et al. | 361/306 X |
| 4,197,570 | 4/1980 | Kobayashi | 361/310 |
| 4,221,033 | 9/1980 | Kobayashi | 29/25.42 |

*Primary Examiner*—Donald A. Griffin
*Attorney, Agent, or Firm*—W. J. Simmons, Jr.

[57] ABSTRACT

A tubular capacitor is formed as follows. A ceramic tube comprising an outer ceramic cylinder and a plurality of radial walls is extruded. The extruded body may also include a second ceramic cylinder coaxial with the first. The one or more cylinders and the radial walls form a plurality of longitudinal passages. After the extrudate is fired and cut, the surfaces of the passages and the remaining surfaces of the cylinder or cylinders are metallized. Selected regions of metalization are removed to form discrete electrodes. Two sets of electrodes are respectively connected to first and second electrical termination means.

10 Claims, 9 Drawing Figures

TUBULAR CAPACITOR AND METHOD OF MAKING

BACKGROUND OF INVENTION

The present invention relates to tubular ceramic capacitors having metallized internal surfaces and having improved electrode interconnection and termination means for increasing volumetric efficiency.

Coaxial capacitors have conventionally comprised a tube of ceramic material such as $BaTiO_3$, $SrTiO_3$ or the like. Inner and outer electrodes are formed on the tube so as to be electrically insulated from each other. Means such as metal cups can be affixed to the ends of the tubular body to make electrical connection to the respective electrodes. Such capacitors and methods of making the same are taught in U.S. Pat. Nos. 4,109,292 and 4,197,570.

The volumetric efficiency of such capacitors can be increased by increasing the electrode surface area by means such as employing a more intricate cross-sectional configuration. For example, U.S. Pat. No. 3,274,468 teaches a cylindrical monolithic capacitor comprising a plurality of ceramic dielectric layers interleaved with conductive electrodes. The process of making such a capacitor is expensive since electrodes and additional dielectric layers must be applied in sequential steps. Also, all electrode layers except the last applied layer must be formed of noble metal in order to withstand the firing of subsequently applied dielectric layers.

Tubular capacitors are generally provided with cup-shaped electrode terminations. Such capacitors exhibit low volumetric efficiency due to the loss of the end space under one of the cups, thus restricting the useful part of the dielectric.

SUMMARY OF THE INVENTION

It is therefore an object of the present invention to provide an inexpensive, easily constructed, volumetrically efficient tubular capacitor. Another object is to provide an improved method of making volumetrically efficient tubular capacitors from extruded tubular structures. A further object is to provide an improved electrode termination which can be applied to various shapes of dielectric extrusions to form cylindrical capacitors having improved volumetric efficiency.

Briefly, the present invention pertains to a tubular capacitor comprising an outer dielectric cylinder and a plurality of radial dielectric walls extending inwardly therefrom, the spaces between the outer cylinder and the radial walls forming longitudinal passages. Conductive electrodes are disposed on the outer and inner surfaces of the cylinder and on the surfaces of the radial walls. First electrical termination means is connected to a plurality of the conductive electrodes, and second electrical termination means is connected to the remainder of the conductive electrodes.

The capacitor may comprise two or more spaced dielectric cylinders coaxial with the first cylinder, in which case the radial walls extend between cylinders. In an embodiment having two such cylinders, the first termination means is connected to the electrodes on the outer surface of the outer cylinder and the inner surface of the inner cylinder, and the second termination means is connected to the conductive electrodes on the remaining surfaces of the cylinders and on the radial walls.

In an embodiment having a single dielectric cylinder, the radial walls may extend from the cylinder to the longitudinal axis thereof. The electrodes in every second passage are connected to the first termination means, the electrodes of the remaining passages being connected to the second termination means. In this embodiment, the conductive electrode on the outer surface of the outer cylinder may be split by an annular gap into first and second sections. The electrodes in every second passage are then electrically connected to the first section of the outer electrode, and the electrodes in the remaining passages are connected to the second section thereof.

The method of the present invention involves the extrusion of a ceramic tube having an outer cylinder and a plurality of inwardly extending radial walls which, along with the cylinder, form a plurality of longitudinally extending passages. More specifically, the extrusion may comprise a plurality of concentric cylinders connected by the radial walls; it may comprise a single cylinder from which the radial walls extend to the longitudinal axis, or some combination of these. The extruded body is fired, and desired portions thereof are provided with conductive electrodes. The fired ceramic tube can be metallized either before or after it is cut into individual lengths. In certain situations the extruded body is cut into pieces two units long prior to metallizing. When this double-length piece is cut into two units, the metallization covers only one endface. Also, end portions of certain passages can be plugged prior to metallization to prevent the electrodes from extending to the ends of those passages. Regions of the metallization that are not needed are removed. First termination means is applied to selected ones of the metallized portions, and second termination means is applied to the remainder thereof.

DESCRIPTION OF THE PREFERRED EMBODIMENTS

Figure 1:
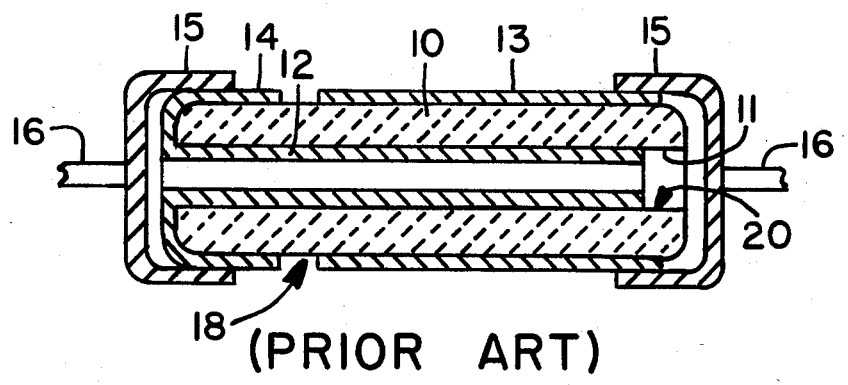
FIG. 1 is an axial cross-sectional view of a conventional tubular capacitor.

FIG. 1 illustrates a conventional tubular ceramic capacitor comprising a tube 10 of ceramic dielectric material having an aperture 11 therethrough. Tube 10 has an inner electrode 12 and outer electrodes 13 and 14 thereon. Metal caps 15 are pressed onto the opposite ends of the coated ceramic tube in mechanical and electrical contact with the electrodes, and wire leads 16 may be electrically connected to caps 15 to electrically connect the capacitor to an external circuit. The extent to which outer electrode 14 extends along its respective end of the capacitor detracts from the capacitance of the unit.

Tube 10 is formed by extruding and then firing a suitable ceramic dielectric material. Suitable ceramic materials include, but are not limited to titanates or niobates of barium, strontium and lead and combinations thereof. The ceramic powder may contain a variety of minor additions to tailor properties to various capacitor specifications. Forming the slurry for extrusion involves adding a deflocculating surface active agent and a viscosity controlling substance to the ceramic powder. The slurry is then extruded through a die. The extruded material is cut to the desired length, depending on metallizing needs; then it is dried in an oven and finally sintered using a cycle varying with the material. After firing, the fully sintered material is metallized and cut apart. Metallization can be accomplished by liquid impregnation of the pieces of the extruded, fired body. Several metallizing systems can be used, such as suspensions of colloidal silver or copper, electroless nickel and/or copper, and the like. Tube 10 may be initially metallized over the entire inner and outer surface thereof, gaps 18 and 20 thereafter being formed by removing a portion of the deposited metal layer by means such as grinding, etching, laser burning or the like.

Commercial tubular capacitors of the type illustrated in FIG. 1 typically employ ceramic tubes having a length in the range of 4–10 mm, an outer diameter in the range 3–5 mm and an inner diameter in the range 1.5–3.0 mm.

In accordance with the present invention volumetric efficiency is enhanced by creating within the ceramic body internal surfaces which are metallized to provide additional electrode area. The exterior of the extruded body can have various cross-sectional shapes such as circular, elliptical, square, rectangular or the like. The cross-sectional shape may depend on the intended method of termination which may be axial, parallel lead (radial) or direct soldering of leadless unit to a circuit board. For the sake of simplicity the embodiments to be described herein are assumed to have a circular cross-section, but it is to be understood that they can be adapted to any exterior shape. The internal cross-sectional shape is designed in such a manner as to provide additional internal capacitive area as well as structural reinforcement of the exterior shell. The two basic configurations are the coaxial cylinder type, wherein two or more coaxial cylinders are joined by radial walls or spokes, and the spoke type wherein spokes or radial walls extend radially from the center to an outer cylinder. Combinations of both configurations can also be used. For any specific cross-sectional configuration, the metallizing and the electrical termination means and/or the interconnection of metallized areas should be carried out in such a manner that maximum capacitance is obtained for the smallest volume of finished capacitor.

To form tubular shapes of the type described hereinbelow, the ceramic slurry is extruded through a die of the type described in British Pat. No. 1,524,388. Pertinent information concerning the extrusion of thin-walled structures may be found in U.S. Pat. No. 3,790,654.

The extruded ceramic precursor may be cut to 10 to 30 cm. length for firing. The sintered rods can be metallized either in full length, or after being cut to the length of individual capacitors. If the metallized long pieces are cut to the proper length, the endfaces are free of metal, and therefore they separate electrically the interior and exterior metallized surfaces. Interconnection between some surfaces may have to be established by applying dots of metal paint in selected locations. For the case of fully metallized pieces of capacitor length, on the other hand, it is necessary to remove metal along circular or other patterns in order to separate the electrode areas to be charged at opposite polarity. It is also possible to metallize pieces of double length and to cut them afterwards in two. In this case all exterior and interior areas are connected on one end only. Metallizing methods and extrusion configurations are very interdependent. A further factor affecting the choice of these structural elements is the type of termination desired for the finished capacitor. Termination can consist of simple solderable metallic end sections, or the same with metallic caps applied thereto. The metal caps can have leadwires welded to them. Leadwires can also be soldered to the metallized end sections either axially or radially. Various examples will be used to illustrate formable combinations.

Concerning choice of configuration for the dielectric extrusion the following considerations can be made. Increase in volumetric efficiency by generation of internal surfaces is limited mainly by the thickness of all parts. Capacitance is maximized by minimizing thickness. The minimum thickness practically obtained by extrusion is, after firing, about 0.08 mm. Such a thickness may be used for the interior walls, but the exterior has to be thicker, at least 0.15 mm, because of strength. Moreover, certain dielectric materials can only be used at a desirable voltage rating if they are about 0.25 mm or thicker. In this case the whole structure, both interior and exterior walls, may have the same thickness. In the more general case, however, the interior surfaces are more important for capacitance, and therefore have to be thin. The external envelope, which is more important for structural strength, has to be thicker. Finally, the internal space can be utilized best if the ratio of internal diameter to the thickness of the interior walls is greater than 4.

Figure 2:
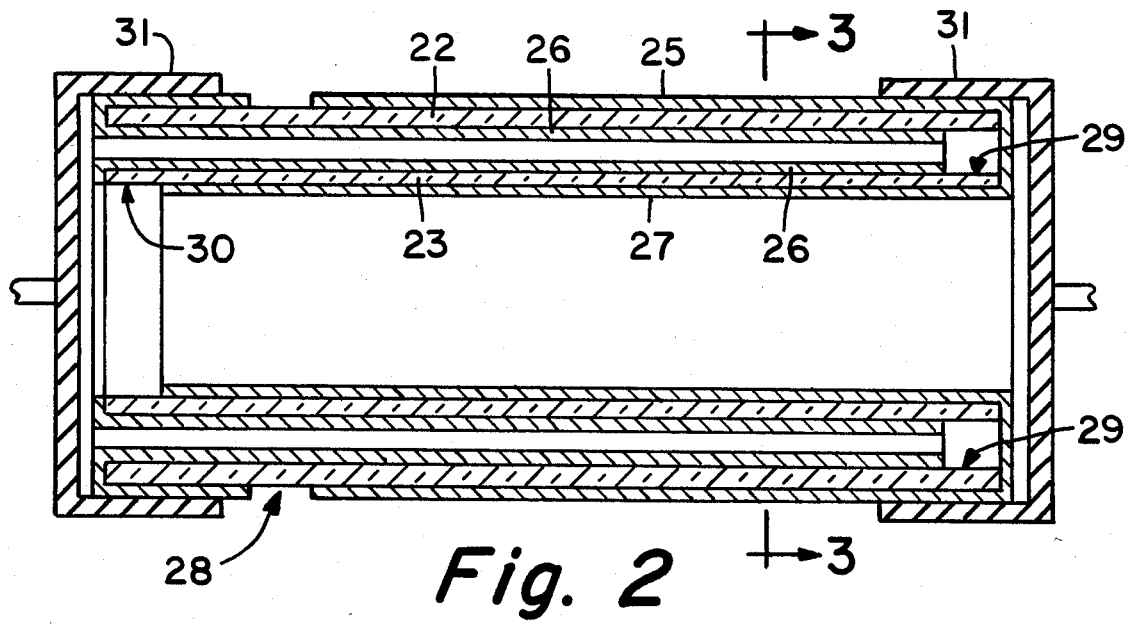
FIG. 2 is an axial cross-sectional view of a tubular capacitor constructed in accordance with this invention.
Figure 3:
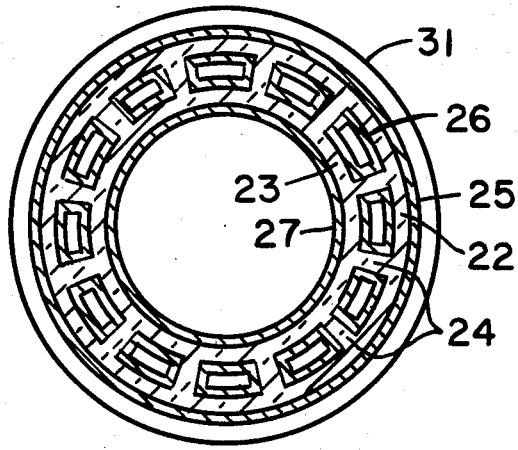
FIG. 3 is a cross-sectional view taken along lines 3—3 of FIG. 2.

A first embodiment of the invention is shown in FIGS. 2 and 3. This embodiment comprises coaxial cylinders 22 and 23 which are held in spaced relationship by longitudinally-extending radial walls or spokes 24. The wall thicknesses of the cylinders, particularly of the inner cylinders, can be reduced to about 25 to 60% of the thickness needed for the one cylinder unit of FIG. 1 because of the reinforcing effect of the spokes holding the coaxial cylinders together in the extruded body.

Electrodes 25, 26 and 27 can be formed by completely metallizing the surfaces of cylinders 22 and 23 and spokes 24 and thereafter removing unwanted portions 28, 29 and 30 of the metallizing by sandblasting, grinding, laser burn-out, or the like. Conventional end caps 31 can then be affixed to the electroded body. As described hereinbelow, the presence of longitudinal passages within the tubular structure permits the use of improved electrode termination means that can increase the capacitance of the unit.

Figure 4:
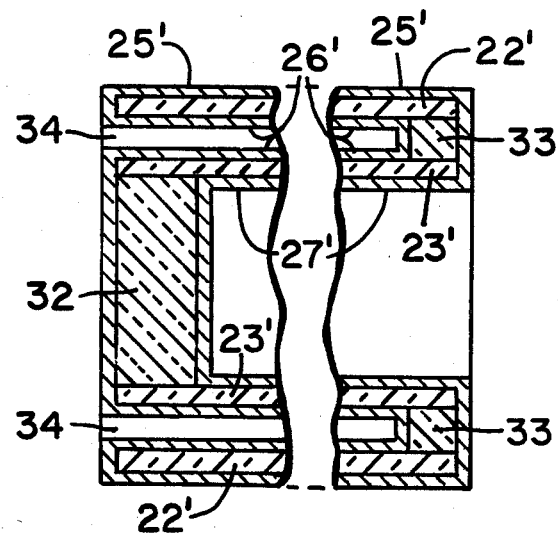
FIG. 4 is a partial cross-sectional view of a modification of the capacitor of FIG. 2.

As shown in FIG. 4, wherein the outer and inner cylinders are designated 22' and 23' respectively, the tubular body can be preshaped before metallizing. To prevent the metallization of the end portion of the inner surface of cylinder 23', plug 32 is inserted into that end of cylinder 23'. Electrode 27' therefore deposits on the inner surface of plug 32 rather than extending to the end of that cylinder. Similarly, plugs 33, which fill the ends of spaces 34 between cylinders 22' and 23', prevent electrode 26' from extending to the ends of cylinders 22' and 23'. Plugs 32 and 33 may consist of a viscous slurry that can be applied by a printing technique and thereafter fired. When plugs 32 and 33 are used, electrode removal is needed only on the exterior electrode (region 28 of FIG. 2). It is noted that removal of a portion of the exterior electrode can also be conveniently used to trim the capacitance of the capacitor.

Figure 5:
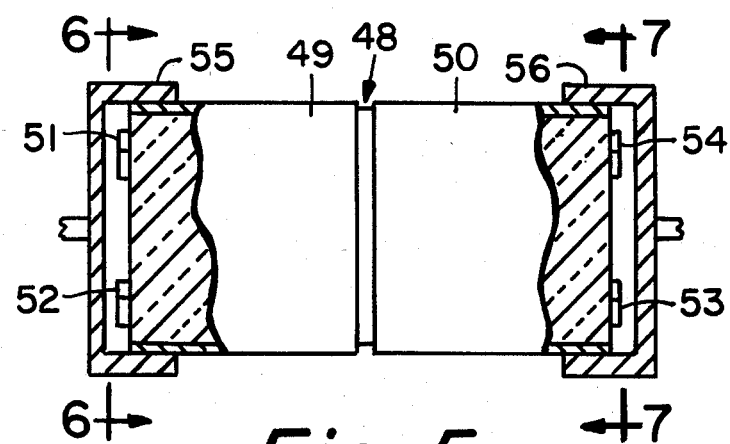
FIG. 5 is a partial axial cross-sectional view of a further embodiment of the invention.

The embodiment of FIG. 5 comprises a ceramic cylinder 37 and spokes 38, 39, 40 and 41 which extend from the cylinder to its axis. The four longitudinally extending passages formed by the cylinder and spokes are metallized to form internal electrodes 43, 44, 45 and 46 which are electrically isolated from each other. The exterior metallization is split in the middle as shown at 48 to form two exterior electrodes 49 and 50. Two opposed internal electrodes 43 and 45 are connected to external electrode 49 by conductive tabs 51 and 52, respectively. The remaining internal electrodes 44 and 46 are connected to external electrode 50 by conductive tabs 53 and 54, respectively. In this configuration the dielectric area of spokes 38-41 is fully utilized whereas only about one-half of the exterior cylindrical surface is utilized. In return, no space or area is wasted by termination end caps 55 and 56 as compared with the more conventional termination of FIG. 1. The external metallizing can be made solderable for direct insertion in a printed circuit board. Metal cups can also be pressed on the two ends for the same purpose. Wires can be welded to the cups if desired.

Figure 6:
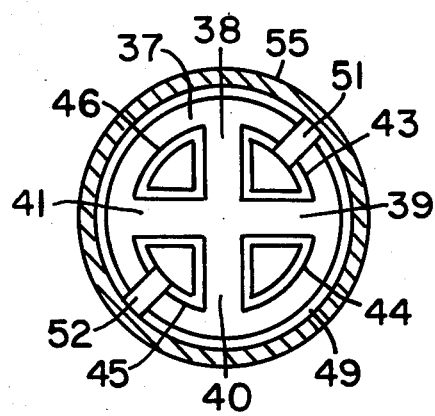
FIGS. 6 and 7 are cross-sectional views taken along lines 6—6 and 7—7, respectively, of FIG. 5.
Figure 7:
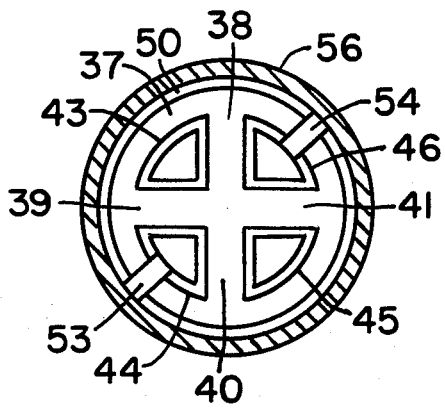
Figure 8:
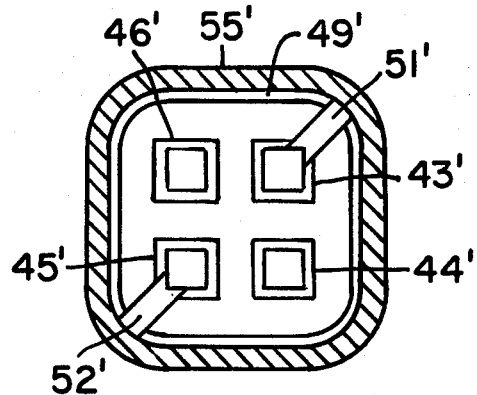
FIG. 8 is a cross-sectional view of an embodiment similar to that of FIG. 5.

The embodiments of FIG. 8 is similar to that of FIGS. 5-7 except for cross-sectional shape. Elements of FIG. 8 which are similar to those of FIGS. 5-7 are represented by primed reference numerals. Whereas the circular cross-section of FIGS. 5-7 is preferred for axial lead devices, the square configuration illustrated in FIG. 8 is better suited for direct soldering onto a circuit board.

Figure 9:
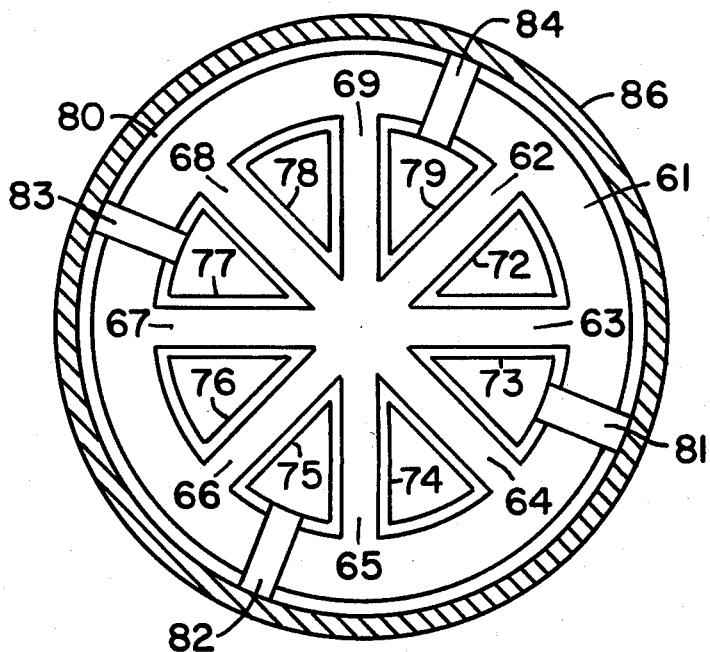
FIG. 9 is a cross-sectional view of yet another embodiment of the invention.

FIG. 9 is a cross-sectional view of a device similar to that illustrated in FIGS. 5-7. This embodiment comprises an outer cylinder 61 and radial walls or spokes 62-69. The passages formed by the cylinder and radial walls are provided with electrodes 72-79, an electrode portion 80 covering the respective end of cylinder 61. Conductive tabs 81-84 connect electrodes 73, 75, 77 and 79, respectively, to outer electrode portion 80. The remaining electrodes 72, 74, 76 and 78 are connected to another outer electrode portion (not shown) at the opposite end of the capacitor. End cap 86 surrounds outer electrode portion 80. In addition to showing that the tube can have eight radial walls, FIG. 9 illustrates the fact that the radial walls can be thinner than the outer wall 61, thereby providing a higher capacitance value.

We claim:

1. A tubular capacitor comprising an outer dielectric cylinder, a plurality of radial dielectric walls extending inwardly from said outer cylinder, the spaces between said outer cylinder and said radial walls forming longitudinal passages, conductive electrodes on the outer and inner surfaces of said cylinder and on the surfaces of said radial walls, first electrical termination means connected to a plurality of said conductive electrodes, and second electrical termination means connected to the remainder of said conductive electrodes.

2. A capacitor in accordance with claim 1 further comprising a second dielectric cylinder within said first cylinder, said radial walls extending between said cylinders, said first electrical termination means connected to the conductive electrodes on the outer surface of said outer cylinder and the inner surface of said inner cylinder, said second termination means connected to the conductive electrodes on the remaining surfaces of said cylinders and on said radial walls.

3. A capacitor in accordance with claim 2 wherein each of said passages that is located between said outer and inner cylinders is plugged at one end thereof.

4. A capacitor in accordance with claim 1 wherein said radial walls extend inwardly to the longitudinal axis of said outer cylinder, the conductive electrodes in every second passage being connected to said first termination means, the conductive electrodes in the remaining ones of said passages being connected to said second termination means.

5. A capacitor in accordance with claim 4 wherein the conductive electrode on the outer surface of said outer cylinder is split into two sections by an annular gap, the conductive electrodes in every second passage being connected at one end of said capacitor to one of said two outer electrode sections, the conductive electrodes in the remaining ones of said passages being connected at the second end of said capacitor to the remaining of said two sections of said outer conductive electrode, said first and second termination means being respectively connected to said first and second sections of said outer conductive electrode.

6. A tubular capacitor comprising outer and inner concentric dielectric cylinders, a plurality of radial walls extending between said cylinders, said walls extending longitudinally along said capacitor and forming along with said cylinders a plurality of longitudinal passages, conductive electrodes on the outer surface of said outer cylinder, the inner surface of said inner cylinder and the walls of said passages, first termination means connected to the conductive electrodes within said passages, and second termination means connected to the remainder of said electrodes.

7. A tubular capacitor comprising a dielectric cylinder, a plurality of radial walls extending from the inner surface of said cylinder to the axis thereof, said walls extending longitudinally along said capacitor and forming along with said cylinder a plurality of longitudinal passages, first and second outer electrodes on the circumferential surface of said cylinder, said outer electrodes being separated by an annular gap, a plurality of electrodes on the surfaces of said longitudinal passages, first conductive means at one end of said capacitor connecting said first outer electrode to the conductive electrodes of every second passage, and second conductive means at the oposite end of said capacitor for connecting said second outer electrode to the conductive electrodes of the remaining ones of said passages.

8. A method of making a tubular capacitor comprising the steps of extruding a ceramic tube having an outer cylinder and a plurality of radial walls which, along with said cylinder, form a plurality of longitudinally extending passages, firing said extruded tube, metallizing desired portions of the outer and inner surfaces of said cylinder and said radial walls, applying first termination means to selected ones of said metallized portions, and applying second termination means to the remainder of said metallized portions.

9. A method in accordance with claim 8 wherein the step of metallizing comprises applying to said desired portions of the outer and inner surfaces of said cylinder and said radial walls a metal that is not sufficiently refractory to withstand said firing step.

10. A method in accordance with claim 8 wherein the step of metallizing comprises plugging selected end regions of said passages, applying a coating of metal over all exposed surfaces, and removing undesired portions of said metal coating.

* * * * *